United States Patent
Ophir et al.

(10) Patent No.: US 6,629,270 B1
(45) Date of Patent: Sep. 30, 2003

(54) SYSTEM FOR INITIALIZING A DISTRIBUTED COMPUTER SYSTEM AND A METHOD THEREOF

(75) Inventors: Einat Ophir, Raanana (IL); Izak Goldfarb, Petach Tikva (IL); Itzhaki Barak, Kadima (IL)

(73) Assignee: Motorola, Inc., Schaumburg, IL (US)

( * ) Notice: Subject to any disclaimer, the term of this patent is extended or adjusted under 35 U.S.C. 154(b) by 538 days.

(21) Appl. No.: 09/626,679

(22) Filed: Jul. 27, 2000

(30) Foreign Application Priority Data

Jul. 28, 1999 (EP) .............................. 99114802

(51) Int. Cl.[7] ............................... G06F 11/14
(52) U.S. Cl. .................. 714/43; 714/4; 714/12; 714/11
(58) Field of Search ................. 714/43, 4, 11, 714/12

(56) References Cited

U.S. PATENT DOCUMENTS

| | | | |
|---|---|---|---|
| 5,583,987 A | * 12/1996 | Kobayashi et al. | ........... 714/13 |
| 5,687,308 A | 11/1997 | Jardine et al. | ......... 395/182.02 |
| 5,694,542 A | 12/1997 | Kopetz et al. | ......... 395/185.02 |
| 5,794,031 A | * 8/1998 | Nakadai | ........................ 713/2 |
| 6,002,851 A | * 12/1999 | Basavaiah et al. | ............. 714/4 |
| 6,263,452 B1 | * 7/2001 | Jewett et al. | .................. 714/9 |
| 6,282,669 B1 | * 8/2001 | Imanaka et al. | ............... 714/4 |

FOREIGN PATENT DOCUMENTS

EP  0535760 A1  4/1993  ........... G06F/11/14

* cited by examiner

Primary Examiner—Scott Baderman
Assistant Examiner—Anne L. Damiano

(57) ABSTRACT

A method and device for initializing a plurality of fail silent computer nodes, coupled to a communication media; the plurality of fail silent computer nodes are adapted to exchange data frames via the communication media. The initialization is based upon sending an initialization word for synchronizing the plurality fail silent computer nodes. The transmission of an initialization word depends upon the state of the computer system and especially the status of the communication media.

20 Claims, 4 Drawing Sheets

SYSTEM FOR INITIALIZING A DISTRIBUTED COMPUTER SYSTEM AND A METHOD THEREOF

FIELD OF THE INVENTION

The present invention relates to a system for initializing a distributed computer system and to a method for initializing a distributed computer system.

BACKGROUND OF THE INVENTION

There is a growing demand for high performance computer systems. Many modern computer systems have a distributed architecture, so that a plurality of computers are coupled to each other via a common communication media. (See: U.S. Pat. No. 5,887,143 of Saito et al and the references mentioned therein).

A premium is placed on the reliability of computer system, especially when the computer system handles safety critical applications such as "brake by wire" applications in vehicles.

The reliability of such a computer system can be enhanced by using fail silent computer nodes, and by synchronizing the computer nodes that share the common communication media. (See: U.S. Pat. No. 4,866,606 of Kopetz, and U.S. Pat. No. 5,694,542 of Kopetz). A fail silent computer node either produce the correct result or does not produce any result at all. Building fail silent computer nodes is well known in the art (see: U.S. Pat. No. 5,694,542 of Kopetz, and the references mentioned therein).

A premium is also placed on the availability of each of the fail silent computer nodes. Thus, there is a need to initialize as many fail silent computer nodes as possible, in a fast manner, even in noisy environments. Furthermore, there is a need to initialize, in a fast manner, fail silent computer nodes either when the computer system is started up and when the system is already working and there is a need to start up a portion of the computer system that has been shut down.

In known circuits it is difficult to reconcile these contrasting requirements in a optimum way. For example, U.S Pat. No. 5,694,542 of Kopetz describes a computer system comprising of a plurality of fail silent units, each fail silent unit has a plurality of fail silent computer nodes. The fail silent units are coupled to two parallel buses. The fail silent computer nodes are initialized upon reception of an initialization word (I-message). After a fail silent computer node is synchronized it sends data frames that differ from the I-message (i.e.—N-message).

A startup timeout parameter is stored within each of the fail silent computer nodes. This parameter determines a period starting from the power up of the computer system and ending during the transmission of the I-message. Thus, after power up a computer node waits until the start up time has elapsed and then sends the I-message. A disadvantage of this solution is that the fail silent computer node that sends the I-message (i.e.—the sender computer) does not check whether either other I-messages or N-messages are simultaneously being sent via the communication media. Thus, a collision of data frames can occur. A further disadvantage of the prior solution is that a the startup timeout parameter is not adapted to various scenarios of initializations, such as noisy communication media, initialization in the presence of other I-messages or even N-messages.

The reliability of such a system can be enhanced by sending an I-message, only if the communication media is silent. Thus, collisions are avoided. A disadvantage of this solution is that in a noisy environment the computer system will not be initialized.

Accordingly, there is a need for improved system and method for initializing a distributed computer system, and for providing a computer system which is both reliable and available.

BRIEF DESCRIPTION OF THE DRAWINGS

While the invention is pointed out with particularity in the appended claims, other features of the invention are disclosed by the following detailed description taken in conjunction with the accompanying drawings, in which:

DETAILED DESCRIPTION OF THE DRAWINGS

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
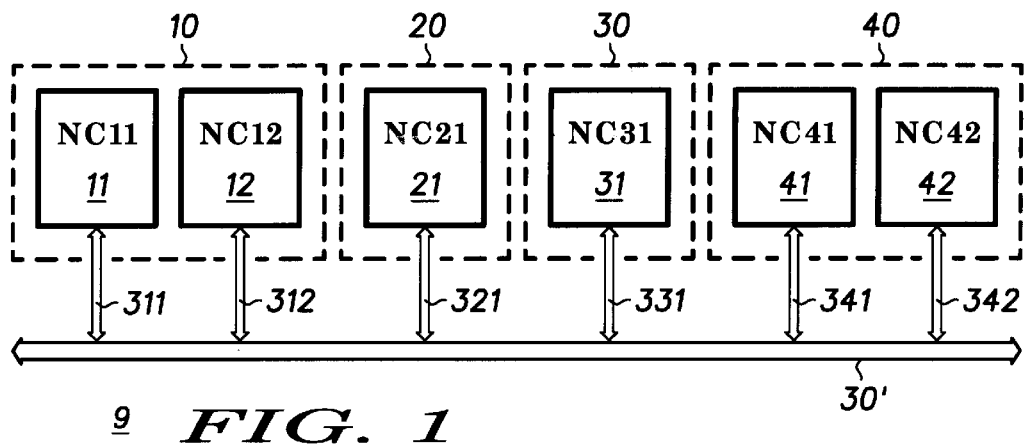
FIG. 1 is a schematic diagram of computer system, according to a preferred embodiment of the invention.
Figure 2:
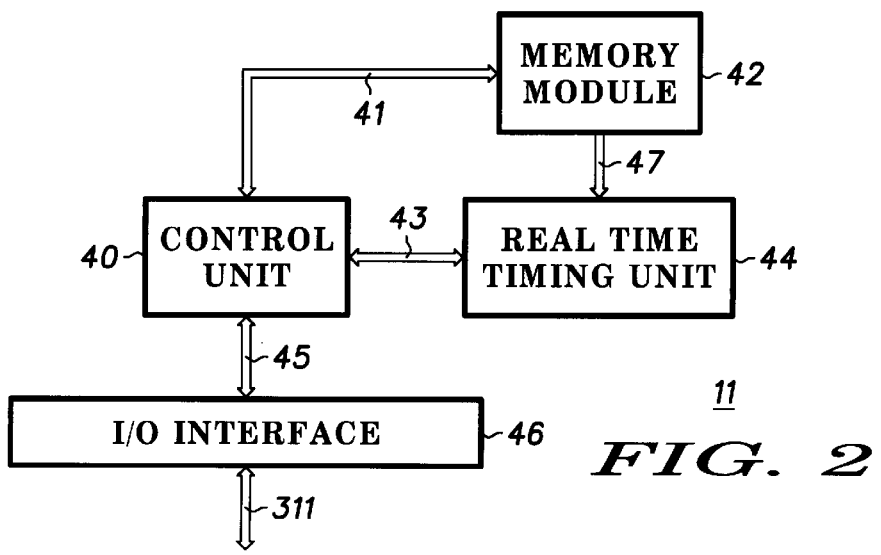
FIG. 2 is a schematic description of a fail silent computer node, according to a preferred embodiment of the invention.

FIG. 1 a schematic diagram of computer system 9 comprising of a communication media 30, coupled to a plurality of fail silent computer nodes (i.e.—computer nodes) NC11 11, NC12 12, NC21 21, NC31 31, NC41 41 and NC42 42 via buses 311, 312, 321, 331, 341 and 342 accordingly. Computer nodes NC11 and NC12 form first group 10, computer node NC21 forms second group 20, computer node NC31 forms third group 30, computer nodes NC41 and NC42 form fourth group 40. FIG. 2 is a schematic description of a fail silent computer node 21, according to a preferred embodiment of the invention.

The access to communication media 30 is controlled by utilizing a time slot for each group, in a cyclic manner. During a group cycle each group can access communication media 30 once, thus a single time slot is allocated to each group during a single group cycle. Only a single fail silent computer node out of a group can access communication media 30 during a single group cycle, the other computer nodes of the group can access communication media 30 during other group cycles. The various group cycles are repeated in a periodical manner. A sequence of periodic group cycles is referred to as a system cycle. Conveniently, during a system cycle each computer node can access communication media 30. Conveniently, a fail silent computer node can produce two types of a data frame. The first type is used to initialize other fail silent computer nodes, and is referred to as an initialization word IW(i) and the second type is not used to initialize fail silent computer nodes. The second type is referred to as non-initialization word NIW(i). Preferably, during a system cycle all the computer nodes transmit either an initialization word and/or a non initialization word. Usually, a portion of the computer nodes are adapted to transmit initialization words. For example, computer nodes NC11, NC21 and NC31 can send initialization words, while NC12, NC41 and NC42 can not send an initialization word. The initialization words are denoted IW11, IW21, IW31 accordingly, and the non-initialization words are denoted NIW11, NIW21, NIW31, NIW41 and NIW42. Each group cycle comprises of four time slots, whereas the first, second third and fourth groups can access communication media 30 during the first, second, third and fourth time slots.

Table 1 shows an exemplary system cycle in which the following initialization and non-initialization words are transmitted by the various groups:

| #1 time slot | #2 time slot | #3 time slot | #4 time slot | # group cycle |
|---|---|---|---|---|
| IW11, | NIW21, | NIW31, | NIW41, | 1 |
| NIW12, | NIW21, | IW31, | NIW42, | 2 |
| NIW11, | IW21, | NIW31, | NIW41, | 3 |
| NIW11, | NIW21, | NIW31, | NIW42, | 4 |
| NIW11, | IW21, | IW31, | NIW412 | 5 |
| NIW12, | NIW21, | NIW31, | NIW42 | 6 |
| IW11, | NIW21, | NIW31, | NIW41 | 7 |
| NIW12, | NIW21, | NIW31, | NIW42 | 8 |

As shown in table 1, initialization word IW11 that is transmitted during the first time slot of the first group cycle is used to initialize computer system 9, while the other initialization words are used to initialize fail silent computer nodes which were shut down after computer system 9 was already initialized. A fail silent computer node can be shut down as a result of a malfunction.

Preferably, a fail silent computer node can further produce a third type of data frame. The third type is another initialization word AIW(i) that is provided after computer system was initialized. AIW(i) is used to enhance computer system 9 reliability by allowing fail silent computer nodes which did not initialize when computer system 9 initialized and fail silent computer nodes that were shut down after computer system 9 was already initialized, to be initialized. Table 2 shows an exemplary system cycle in which the following initialization words, another initialization words and non-initialization data words are transmitted by the various groups:

| #1 time slot | #2 time slot | #3 time slot | #4 time slot | # group cycle |
|---|---|---|---|---|
| IW11, | NIW21, | NIW31, | NIW41, | 1 |
| NIW12, | NIW21, | AIW31, | NIW42, | 2 |
| NIW11, | AW21, | NIW31, | NIW41, | 3 |
| NIW12, | NIW21, | NIW31, | NIW42. | 4 |
| NIW11, | AW21, | AW31, | NIW41 | 5 |
| NIW12, | NIW21, | NIW31, | NIW42 | 6 |
| AW11, | NIW21, | NIW31, | NIW41 | 7 |
| NIW12, | NIW21, | NIW31, | NIW42 | 8 |

Referring to FIG. 2, fail silent computer node 11 comprising of: control unit 40, memory module 42, real time timing unit 44 and I/O interface 46. Control unit 40 is coupled to memory module 42, real time timing unit 44 and I/O interface 46 via buses 41, 43 and 45 accordingly. Real time timing unit 44 is further coupled to memory module 42 via bus 47. Real time timing unit 44 provides timing signals within the fail silent computer node. The timing signals initiate various accesses to communication media 30. Memory module 42 stores a plurality of instructions I(j,1).

The plurality of instructions I(j,1) are executed by control unit 40, and determine when control unit 40 can access communication media 30. Preferably, instructions I(j,1) comprising operand instructions O(j,1) for controlling the access to communication media 30, and time of execution instructions T(j,1) specifying when each O(j,1) is to be executed, where j is an index having values 1 ... M. T(j,1) comply to the time slots allocated to NC11 11. The time of execution instructions of instructions which cause NC11 11 to transmit data frames are bounded between the beginning and the end of the time slot allocated to NC11. For example, and in reference to TABLE 1, the second instruction of NC11 11 (i.e.—I(1,1)) will be to transmit IW11, and the corresponding time of instruction T(1,1) will be during the first time slot of the first group cycle. The second instruction of NC11 11 (i.e.—I(2,1) will be to receive data from communication media 30.

Conveniently, memory module 42 also stores a plurality of application instruction AI(v), which are executed by control unit 40, whereas their execution does not involve transmitting data frames to communication media 30.

Figure 3:
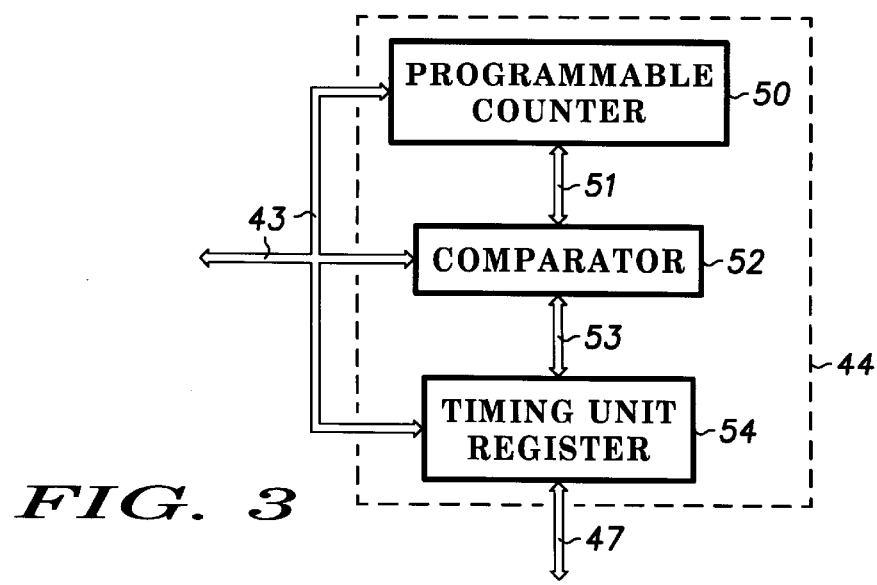
FIG. 3 is a schematic description of a real time timing unit, according to a preferred embodiment of the invention.

Referring to FIG. 3, real time timing unit 44 comprises of a programmable counter 50, a comparator 52 and a timing unit register 54. Comparator 52 is coupled to programmable counter 50 via bus 51, to control unit 40 via bus 43 and to timing unit register 54 via bus 53. Control unit is coupled to programmable counter 50, comparator 52 and timing unit register 54 via bus 43. Timing unit register 54 is coupled to memory module 42 via bus 47. Control unit 40 writes data to programmable counter 50, via bus 43, and can also send control signals via bus 43, for controlling the reception of T(j,i) within timing unit register 54. Comparator 52 receives the output signals provided by programmable counter 50 and a time of execution instruction T(j,i), associated to the next instruction to be executed. T(j,i) is stored within timing unit register 54, and is initially provided by either memory module 42 or control unit 40, via buses 47 or 43 accordingly. Comparator 52 compares between T(j,i) and the output signals provided by programmable counter 50 and notifies control unit 40, by sending MATCH signals via bus 43, when they match when the next instruction is to be executed.

The M instructions are executed in a cyclic manner, thus the execution of instruction I(M,i) is followed by the execution of instruction I(1,i). M instructions I(1,i) till I(M,i) are referred to as the i'th instruction set. Usually, a single instruction set is executed during a single system cycle.

Preferably, some of the instruction sets have instructions that involve transmitting another initialization words AIW(i) via communication media 30 to other fail silent computer nodes. Therefore, another initialization words are sent throughout computer system 10 in a periodic manner. Thus, even if a fail silent computer node was shut down, it can be started up within a system cycle, after receiving an initialization word.

Usually, after a fail silent computer node is powered up, its control unit jumps to an initialization routine IR(i). If the fail silent computer node can send an initialization word IW(i), the routine handles the transmission of IW(i), else the routine handles the reception of IW(i). Conveniently, the initialization routine is not included in the i'th instruction set I(1,i) till I(M,i).

Those who are skilled in the art will appreciate that initialization routine IR(i) can be a part of instruction set I(1,i) till I(M,i) but it is not repeated in a periodic manner.

Table 3 shows an exemplary system cycle in which the following initialization words, another initialization words and non-initialization data words are transmitted by the various groups:

| #1 time slot | #2 time slot | #3 time slot | #4 time slot | # group cycle |
|---|---|---|---|---|
| IW11/NIW11, | NIW21, | AIW31, | NIW41, | 1 |
| NIW12, | NIW21, | NIW31, | NIW42, | 2 |
| NIW11, | AW21, | NIW31, | NIW41, | 3 |
| NIW12, | NIW21, | NIW31, | NIW42. | 4 |
| NIW11, | AW21, | AW31, | NIW41 | 5 |
| NIW12, | NIW21, | NIW31, | NIW42 | 6 |
| AW11, | NIW21, | NIW31, | NIW41 | 7 |
| NIW12, | NIW21, | NIW31, | NIW42 | 8 |

As shown, when the initialization routine RI(i) is executed, first computer node 11 transmits IW11, and in consecutive group cycles it transmitts NIW11.

A fail silent computer node that is scheduled to transmit an initialization word IW(i), will send an initialization word IW(i) if it did not receive any initialization word (IW(i) or AIW(i)) since it was powered up; and if one of the following conditions was fulfilled:

(One) a timeout period TO(i) has elapsed since it was powered up or since it received non valid data frames, and during this period the fail silent computer node did not receive either data frames or noise from communication media (i.e.—communication media 30 was silent).

(Two) a predetermined period PP(i) has elapsed since it was powered up or since it received non valid data frames, during that period it received noise from the communication media.

If the fail silent node computer receives a non-valid data frame, it is assumed that the computer system is active. In such a case, the fail silent will not send an initialization word, in order to avoid collisions. It will wait to receive an initialization word from another fail silent computer node, or until one of the above conditions is fulfilled. Conveniently, before a fail silent computer node receives a valid initialization word, it will character a non-initialization word as a non-valid data frame.

If the communication media is silent during TO(i), it is assumed that the computer system was not yet initialized—no data frames, and especially no initialization words were transmitted, therefore the fail silent computer node is the first to send an initialization message.

If the communication media was noisy but no data frames, either valid or non valid were received during period PP(i), it is assumed that the computer system was not yet initialized. PP(i) is longer than TO(i), in order to increase the reliability of the computer system. For every i PP(i)<>PP(i+1) and TO(i)<>TO(i+1).

Conveniently, TO(i) is longer than the period in which R fail silent computer nodes were scheduled to transmit a data frame. R being an integer, M>R>1. TO(i) is usually longer than a group cycle.

Conveniently, PP(i) is longer than the period in which T fail silent computer nodes were scheduled to transmit a data frame. T being an integer, M>T>R>1. PP(i) is usually longer than a system cycle.

The determination of whether the communication is silent, is noisy or whether non-valid data frames were sent via communication media is based upon a variety of criteria, and is usually tailored to the coding scheme used upon the data frames. Conveniently, this determination process is performed by control unit 40. In an embodiment of the invention, after a fail silent computer node is powered up, its control unit fetches from its memory module a routine that handles this determination process.

For example, a non-valid data frame can be identified as a data frame header having K1 bits, followed by K2 of data bits, K1+K2 are referred to as K. K, K1 and K2 being a predetermined values. Usually, the K bit are in accordance to the communication protocol, but a check made upon the data frame fails. For example, a CRC check shows that the header and the K bits are not-valid.

Preferably, and in order to avoid collisions, before a fail silent computer node is synchronized, it regards non initialization words as non valid data frames.

In a preferred embodiment of the invention, both IW(i) and IW(i) comprise of a header HD(i), a time portion TIW(i) and a delta portion PIW(i), the header further comprises a type flag TP(i). IW(i) and AIW(i) are B bits long, whereas B>=K. A non initialization word comprises of a header HD(i) and a plurality of data words, whereas the shortest data word is comprised of Q data bits, Q>=K. TP(i) reflects whether the data frame is an initialization word, another initialization word or a non initialization word. The time portion TIW(i), reflects a timing signal provided by the real time timing unit of the fail silent computer node that sent the initialization word IW(i). The delta portion PIW(i), for providing data which is used for determining the offset between the transmission of the initialization word and the update/synchronization performed in a receiving fail silent computer node. The delta portion PIW(i) can also store an address of a subroutine within memory module 42, for updating the programmed counter of the real time timing unit. For example, memory module 48 can store three subroutines DR(1,1)–DR(1,3) whereas the first subroutine DR(1,1) handles the update procedure that results from the reception of IW11, DR(1,2) handles the update procedure results from the reception of IW21 and DR(1,3) handles the update procedure that results from the reception of IW31. The predetermined offset can be either measured or calculated. The predetermined offset reflects the delay between the point in time in which the initialization word is sent by a fail silent computer node and the point in time in which the programmed counter of the receiving fail silent node computer is updated.

Conveniently, after a fail silent computer node sends an initialization word IW(i), it waits to receive an acknowledge word at least one other fail silent computer node. The acknowledge word provided from the g'th fail silent computer node is referred to as ACK(g) g<>i. One of the first instructions out of the g'th instruction set, and even the first instruction of the g'th fail silent instruction word I(1,g) is to send ACK(g). For example, and in reference to table 1, after IW11 is sent by NC11 11, NC21 21, NC31 31 and NC41 41 send an acknowledge word during the second time slot, third time slot and fourth time accordingly of the first group cycle. NC12 12 and NC42 42 send an acknowledge word during the first time slot and the fourth time slot accordingly, of the second group cycle. Preferably, an acknowledge word is an another initialization word AIW.

If the communication media is silent and the transmission of IW(i) was not followed by the reception of an acknowledge word, during a predetermined period of TACK(i), another initialization word IW(i) is sent. If the communication media is noisy and the transmission of IW(i) was not followed by the reception of an acknowledge word, during a predetermined period of TACKN(i), another initialization word IW(i) is sent. Preferably, this procedure will repeat itself up till TR(i) initialization word are sent without receiving an acknowledge word. In such a case, the I'th fail silent computer node stops sending initialization words and waits to receive an initialization word from another fail silent computer node, or can even shut down. TACK(i)<= TO(i), TACKN(i)<=PP(i).

Conveniently, ACK(g) comprises of a header HD(g), an type flag TP(g), a time portion TIW(g) and a delta portion PIW(g). The type flag indicated that the ACK(g) is a non initialization word or an initialization word (according to the implementation of ACK(g)), TIW(g) reflects a timing signal provided by the real time timing unit of the fail silent computer node that sent the acknowledge word ACK(g), after the real time timing unit is updated/synchronized. The delta portion PIW(g), provides data which is used for determining the offset between the transmission of ACK(g) and a check that is performed by NC(i) over ACK(g). NC(i). checks whether the g'th fail silent computer node was successfully synchronized by comparing the timing signals provided by its real time timing unit to TIW(g) plus the offset.

Figure 4:
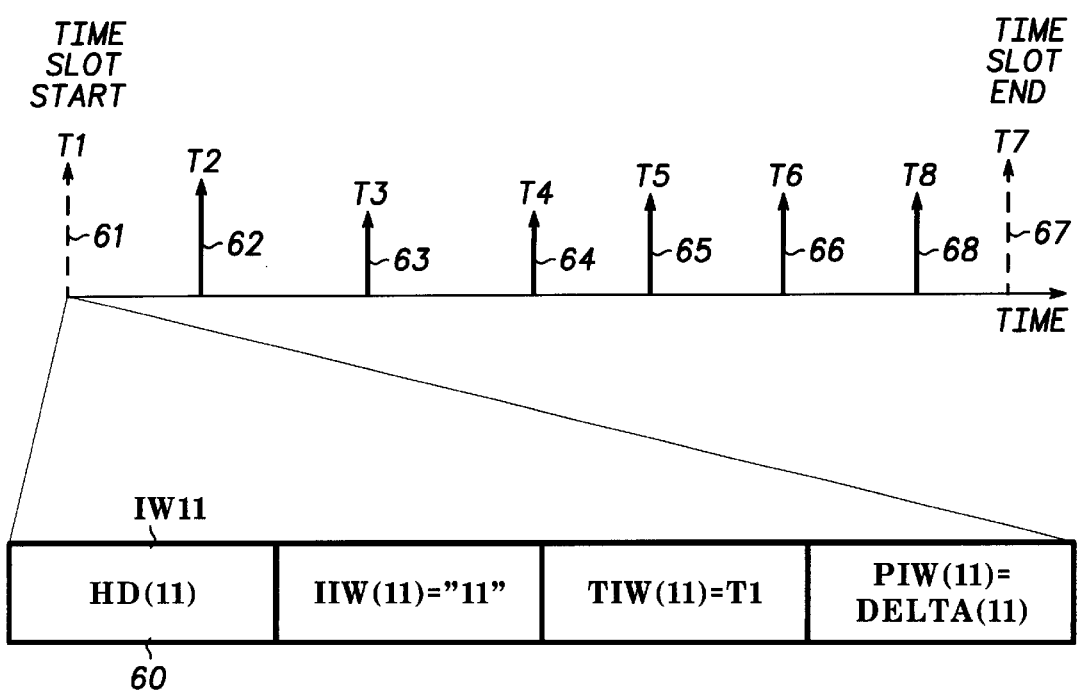
FIG. 4 is a timing diagram illustrating the transmission and reception of an initialization word.

FIG. 4 is a timing diagram illustrating the transmission and reception of an initialization word IW(11) 60 sent by NC11 (11). If IW(11) is sent in the first time slot of the first group cycle (as seen in tables 1 and 2), the transmission and preferably the reception occur during this time slot, that starts at T1 61 and ends at T7 67. During that time slot NC11 11 sends initialization word IW(11) 60, and the other fail silent computer nodes receive the word and initialize themselves accordingly. The other fail silent computer nodes send acknowledge words during the time slots in which they are allowed to access communication media 30. IW(11) 60 comprises of header HD(11) having a flag portion IIW(11), which is set, time portion TIW(11) wherein the content of TIW(11) equals T2, the time in which IW(11) it transmitted, and a delta portion PIW(11) which indicates that the initialization word was sent from NC11 11.

These offsets ((T8-T2), (T3-T2), (T4-T2), (T5-T2), (T6-T2)) were previously calculated or measured. NC12 12, NC21 21, NC31 31, NC41 41 and NC42 42 update their real time timing unit at T8 68, T3 63, T4 64, T5, 65, T6 66 and T8 68 accordingly. The update will be done by adding T2 to the predetermined offsets (T8-T2), (T7-T2), (T4-T2), (T5-T2) and (T6-T2) and writing the results to their real time timing units.

Figure 5:
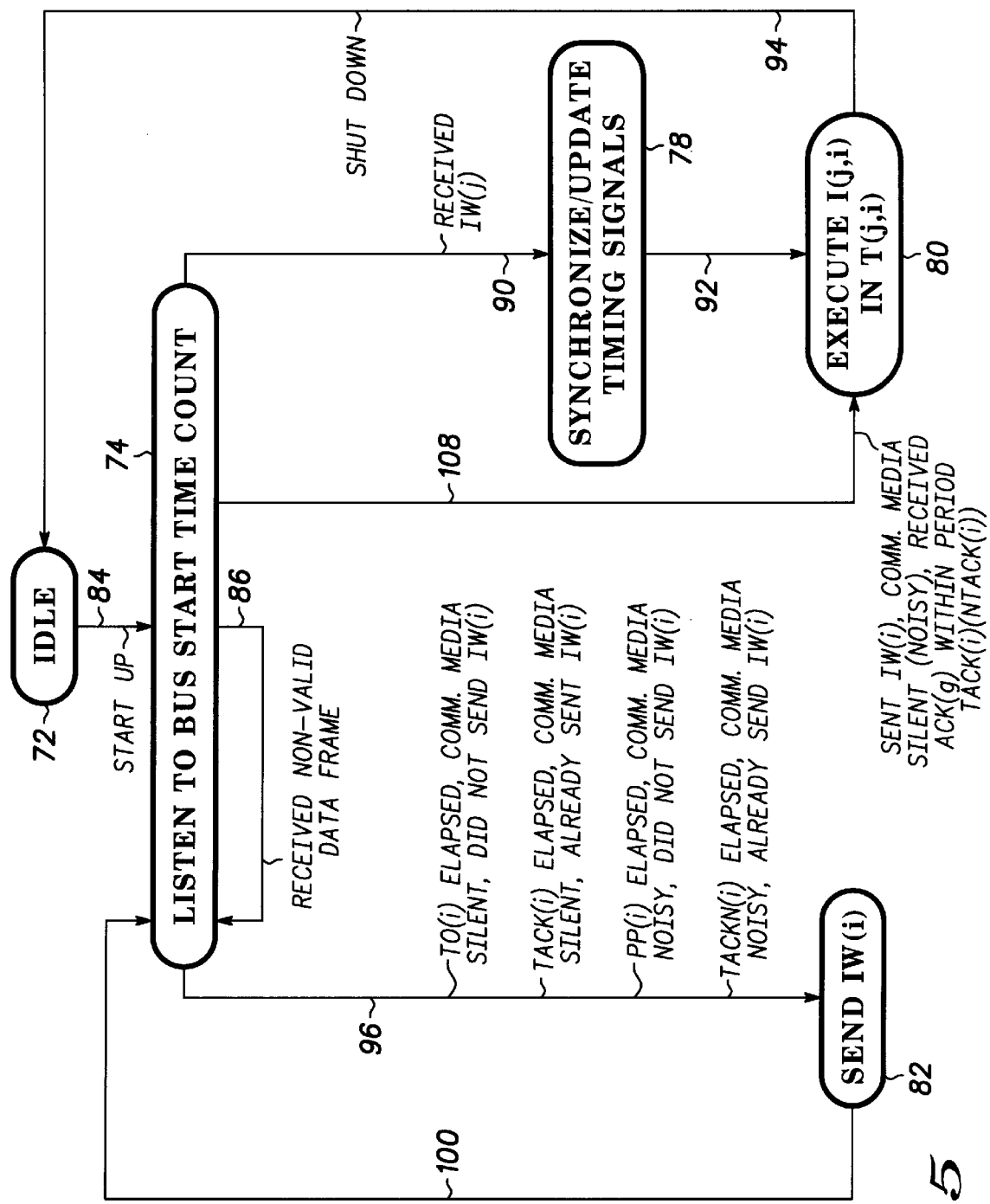
FIG. 5 is a flow chart of a method for initializing a distributed computer system, according to a preferred embodiment of the invention.

FIG. 5 is a flow chart of a method 70 for initializing a distributed computer system, according to a preferred embodiment of the invention.

Boxes 72, 74, 78, 80 and 82 represent various steps of method 70. Before steps 72-82 are executed, the time offsets between the transmission of an initialization word from fail silent computer nodes to the update of the real time timing units within other fail silent computer nodes are calculated or measured, and written to the memory modules within the plurality of fail silent computer nodes. Preferably, these offsets are a part of a plurality of subroutines DR(i,g) that handle the synchronization of the fail silent computer nodes. A set of the time offset between the transmission of acknowledge words to their check is also calculated or measured and written to the memory modules within the plurality of fail silent computer nodes. Furthermore, A plurality of instructions I(j,i), are written to the plurality of memory modules of the fail silent computer nodes. Each instruction I(j,i) has an operand instructions O)j,1) for controlling the access to a communication media and time of execution instructions T(j,1) specifying when each O(j,1) is to be executed.

Method 70 comprises of the following steps:

IDLE step 72 in which the fail silent computer node in not active. As indicated by path 84, when a fail silent computer node is started up, step 72 is followed by step 74 of listening to the communication media.

Listening, during step 74, to the communication media and determining whether the fail silent computer node received noise, received an initialization word from another fail silent computer node, received a non valid data frame or whether communication media 30 is silent. At the beginning of step 74, the fail silent computer node starts to count time. The time count is reset each time step 74 begins.

Jumping to step 74 of listening to communication media, if a non valid data frame was received, as indicated by path 86.

Synchronizing, during step 78, between the fail silent computer node NC(i) to a fail silent computer node NC(q) that has transmitted an initialization word IW(q), if IW(q) was received, as indicated by path 90. Jumping to step 80 of executing instructions I(j,i).

Transmitting an initialization word IW(i), during step 82, if either of the following conditions is fulfilled:
  a timeout period of TO(i) has elapsed from the beginning of step 74, the communication media was silent and NC(i) did not send any initialization word IW(i) since step 72;
  a predetermined period of PP(i) has elapsed from the beginning of step 74, the fail silent computer node received noise and NC(i) did not send any initialization word IW(i) since step 72;
  a period of TACK(i) has elapsed from the beginning of step 74, the communication media was silent, NC(i) has already sent initialization word IW(i) but did not receive acknowledge word ACK(g) during a period of TACK(i);
  a predetermined period of TACKN(i) has elapsed from the beginning of step 74, the fail silent computer node received noise and NC(i) has already sent initialization word IW(i) but did not receive acknowledge word ACK(g) during a period of TACKN(i).

Executing instructions I(i,k) in a periodic manner, during step 80 and as indicated by path 108, if initialization word IW(i) was sent and either one of the following conditions is fulfilled:
  The communication media was silent and during a period of TACK(i) at least one acknowledge word ACK(g) was received, and a check that is done upon ACK(g) shows that NC(i) and NC(g) are synchronized;
  The communication media was noisy and during a period of TACKN(i) at least one acknowledge word ACK(g) was received, and a check that is done upon ACK(g) shows that NC(i) and NC(g) are synchronized.

Conveniently, some of instructions I(j,i) involve sending an acknowledge word, checking acknowledge words, sending AIW(n).

As indicated by path 94 in a case of a shut down, step 80 is followed by IDLE step 72.

Figure 6:
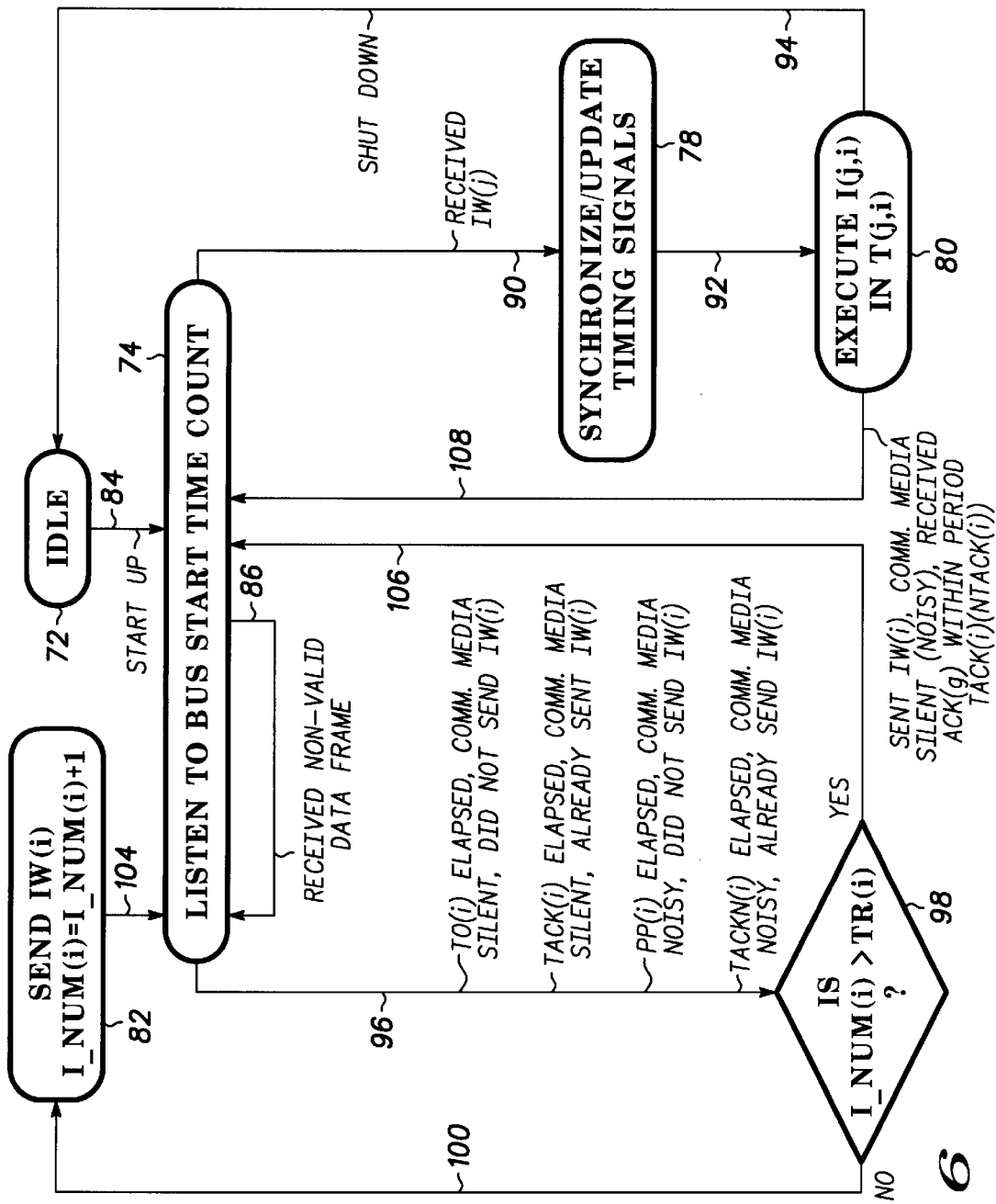
FIG. 6 is a flow chart of a method for initializing a distributed computer system, according to another preferred embodiment of the invention.

FIG. 6 is a flow chart of a method 70' for initializing a distributed computer system, according to another preferred embodiment of the invention. Method 70' is analogues to method 70' but also has a mechanism that controls the transmission of initialization words. According to the additional mechanism, NC(i) will send up to TR(i) initialization words, and if there was no response it will stop sending initialization words and preferably wait until it receives an initialization word from another fail silent computer node. During modified step 82, each time IW(i) is sent an index value I_NUM(i) is incremented. I_NUM(I) is compared to TR(i) during additional step 98. I_NUM(i) is reset when the fail silent computer node is started up.

In method 70' step 74 is followed by additional step 98, if either of the following conditions is fulfilled:

- a timeout period of TO(i) has elapsed from the beginning of step 74, the communication media was silent and NC(i) did not send any initialization word IW(i) since step 72;
- a predetermined period of PP(i) has elapsed from the beginning of step 74, the fail silent computer node received noise and NC(i) did not send any initialization word IW(i) since step 72;
- a period of TACK(i) has elapsed from the beginning of step 74, the communication media was silent, NC(i) has already sent initialization word IW(i) but did not receive acknowledge word ACK(g) during a period of TACK(i);
- a predetermined period of TACKN(i) has elapsed from the beginning of step 74, the fail silent computer node received noise and NC(i) has already sent initialization word IW(i) but did not receive acknowledge word ACK(g) during a period of TACKN(i).

During step 98 NC(i) checks if I_NUM(i)>TR(i), and if the answer is YES, additional step 98 is followed by step 74, as indicated by additional path 106. If the answer is NO, additional step 98 is followed by modified step 82, as indicated by path 100. Modified step 82 is followed by step 74, as indicated by additional path 104.

Thus, there has been described herein an embodiment including at least one preferred embodiment of an improved method and apparatus for initializing a distributed computer system.

It will be apparent to those skilled in the art that the disclosed subject matter may be modified in numerous ways and may assume many embodiments other than the preferred form specifically set out and described above. Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. A system for initializing a distributed computer system, said system comprising:

a plurality of fail silent computer nodes, coupled to a communication media; the plurality of fail silent computer nodes being adapted to exchange data frames via the communication media; wherein each fail silent computer node comprising:

a real time timing unit, for providing timing signals within the fail silent computer node;

an I/O interface, coupled to the communication media;

a control unit, coupled to the I/O interface and to the real time timing unit;

a memory module, coupled to the control unit and to the real time timing unit, for storing a plurality of instructions I(j,i);

wherein the control unit is adapted to execute the plurality of instructions I(j,i) and access the communication media;

wherein a fail silent computer node is adapted to initialize other fail silent computer nodes, by sending an initialization word IW(i), for synchronizing the timing signals provided by the real time timing units of the plurality of fail silent computer nodes, the initialization word IW(i) is sent if the fail silent computer node did not receive an initialization word from another fail silent computer node, and when either one of the following conditions is fulfilled:

(a) the fail silent computer node did not receive non-valid data frames and did not receive noise from the communication media during a timeout period of TO(i); and (b) the fail silent computer node received noise from the communication media during a second predetermined period of PP(i).

2. The system of claim 1 wherein TO(i) is longer than the period in which R fail silent computer nodes were scheduled to transmit data frames, R being an integer and M>R>1, M being the number of fail silent computer nodes within the computer system.

3. The system of claim 2 wherein PP(i) is longer than the period in which T fail silent computer nodes were scheduled to transmit a data frame; wherein T being an integer and M>T>R>1.

4. The system of claim 1 wherein a fail silent computer node is adapted to send an initialization word and wait a period of TACK(i) for receiving an acknowledge word from another fail silent computer node that received the initialization word and initialized accordingly;

wherein if the fail silent computer did not receive the acknowledge word it will send another initialization word if the fail silent computer node did not receive an initialization word from another fail silent computer node, and when either one of the following conditions is fulfilled:

(a) the fail silent computer node did not receive non-valid data frames and did not receive noise from the communication media during a timeout period of TACK(i); and (b) the fail silent computer node received noise from the communication media during a period of TACKN(i).

5. The system of claim 4 wherein TACK(i)<=TO(i) and TACKN(i)<=PP(i).

6. The system of claim 5 wherein a fail silent computer node is adapted to send up to TR(i) initialization words without receiving in response an acknowledge word.

7. The system of claim 1 wherein the plurality of fail silent computer nodes are allocated to a plurality of groups;

wherein each group has at least one fail silent computer node;

wherein the access to the communication media is controlled by utilizing a time slot for each group, in a cyclic manner, so that each group can access the communication once during a group cycle; and wherein TO(i) is longer than a group cycle.

8. The system of claim 7 wherein some of the fail silent computer nodes are adapted to transmit a non initialization word during a first group cycle, and to transmit an initialization word during a second group cycle;

wherein the group cycles are repeated in a periodical manner, so that each group cycle occurs at least once during a system cycle; and wherein PP(i) is longer than a system cycle.

9. The system of claim 1 wherein the instructions I(j,i) comprising operand instructions O(j,i) for controlling the reception of data frames and the transmission of data frames via the communication media, and time of execution instructions T(j,i) specifying when each O(j,i) is to be executed, where i is an index having values 1 . . . M and j is an index having values of 1 . . . L; and wherein L fail silent computer nodes are coupled to the communication media.

10. The system of claim 1 wherein the initialization word is comprised of:

a header HD(i);

an initialization flag IIW(i), for identifying a data frame as an initialization word;

a time portion TIW(i), reflecting a timing signal provided by the real time timing unit of the fail silent computer node that sent the initialization word IW(K);

a delta portion PIW(i), for providing data to be used in determining an offset between the fail silent computer node that sent the initialization word and the other fail silent communication nodes.

11. The system of claim 10 wherein the delta portion PIW(k) points to a synchronization instruction within the memory module of a fail silent computer node, the execution of the synchronization instruction involves adding a predetermined offset value to the time portion TIW(k) of the initialization word IW(k) and updating the real time timing unit accordingly.

12. A method for initializing a distributed computer system, the distributed system having a plurality of fail silent computer nodes, the fail silent computer nodes are coupled to a communication media, the method comprising the steps of:

starting up a fail silent computer node;

listening to the communication media and determining whether the fail silent computer node received noise, received an initialization word from another fail silent computer node, received a non valid data frame, received an acknowledge word, or whether the communication media is silent, and counting a time period from the beginning of the step of listening to the communication media;

jumping to step of listening to the communication media if a non valid data frame was received and resetting the time count that was started at the step of listening to the communication media;

synchronizing between the fail silent computer node and the other fail silent computer node that sent the initialization word, if the fail silent computer node received an initialization word from the other fail silent computer node;

jumping to a step of executing instructions I(i,j) if either one of the two conditions is fulfilled:

the fail silent received only an acknowledge word from another fail silent computer node, during a period of TACK(i);

the fail silent computer node received both noise and an acknowledge word from another fail silent computer node, during a period of TACKN(i);

transmitting an initialization word, if either one of the two conditions is fulfilled:

the fail silent computer node did not receive non-valid data frames and did not receive noise from the communication media during a timeout period of TO(i);

the fail silent computer node received noise from the communication media during a second predetermined period of PP(i); and executing instructions I(i,k) in a periodic manner.

13. The method of claim 12 wherein TO(i) is longer than the period in which R fail silent computer nodes were scheduled to transmit an initialization word; wherein R being an integer and M>R>1, M being the number of fail silent computer nodes within the computer system.

14. The method of claim 13 wherein PP(i) is longer than the period in which T fail silent computer nodes were scheduled to transmit a data frame; wherein T being an integer and M>T>R>1.

15. The system of claim 14 wherein TACK(i)<=TO(i) and TACKN(i)<=PP(i).

16. The system of claim 15 wherein a fail silent computer node is adapted to send up to TR(i) initialization words without receiving in response an acknowledge word.

17. The method of claim 12 wherein the plurality of fail silent computer nodes are allocated to a plurality of groups;

wherein each group comprises of at least one fail silent computer node;

wherein the access to the communication media is controlled by utilizing a time slot for each group, in a cyclic manner, so that each group can access the communication once during a group cycle; and wherein TO(i) is longer than a group cycle.

18. The method of claim 17 wherein some of the fail silent computer nodes are adapted to transmit a non initialization word during a first group cycle, and to transmit an initialization word during a second group cycle;

wherein the group cycles are repeated in a periodical manner, so that each group cycle occurs at least once during a system cycle; and wherein PP(i) is longer than a system cycle.

19. The method of claim 12 wherein the instructions I(i,k) comprise operand instructions O(i,k) for controlling the reception of data frames and the transmission of data frames via the communication media, and time of execution instructions T(i,k) specifying when each O(i,k) is to be executed, where i is an index having values 1 . . . M and k is an index having values of 1 . . . L; and wherein L fail silent computer nodes are coupled to the communication media.

20. The system of claim 19 wherein the initialization word is comprised of:

a header HD(i);

an initialization flag IIW(i), for identifying a data frame as an initialization word;

a time portion TIW(i), reflecting a timing signal provided by the real time timing unit of the fail silent computer node that sent the initialization word IW(K); and a delta portion PIW(i), for providing data to be used in determining an offset between the fail silent computer node that sent the initialization word and the other fail silent communication nodes.

* * * * *